US012759736B2

(12) United States Patent
Henry et al.

(10) Patent No.: US 12,759,736 B2
(45) Date of Patent: Oct. 13, 2026

(54) TWIST-PITCH COUPLED BALL-AND-SOCKET JOINT FOR AN AIRCRAFT HORIZONTAL TAIL

(71) Applicant: U.S. Army DEVCOM, Army Research Laboratory, Adelphi, MD (US)

(72) Inventors: Todd C. Henry, Aberdeen, MD (US); John T. Hrynuk, Joppa, MD (US); Kevin P. Haughn, Baltimore, MD (US); Jeff T. Auletta, Edgewood, MD (US); Bradley D. Lawrence, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 107 days.

(21) Appl. No.: 18/940,427

(22) Filed: Nov. 7, 2024

(65) Prior Publication Data

US 2026/0131916 A1 May 14, 2026

(51) Int. Cl.
*B64U 40/10* (2023.01)
*B64U 30/40* (2023.01)

(52) U.S. Cl.
CPC ............ *B64U 40/10* (2023.01); *B64U 30/40* (2023.01)

(58) Field of Classification Search
CPC ................................ B64U 40/10; B64U 30/40
See application file for complete search history.

(56) References Cited

U.S. PATENT DOCUMENTS

| | | | | |
|---|---|---|---|---|
| 10,518,903 | B2 * | 12/2019 | Sirvis | B64F 1/06 |
| 2011/0079677 | A1 * | 4/2011 | Chronister | B64U 10/40 244/11 |
| 2022/0153408 | A1 * | 5/2022 | Zheng | B64C 33/025 |

OTHER PUBLICATIONS

CN 106628202 and merged translation (Year: 2017).*
(Continued)

*Primary Examiner* — Marisa V Conlon
(74) *Attorney, Agent, or Firm* — Eric B. Compton

(57) ABSTRACT

Systems and apparatus for controlling presentation of an aircraft tail assembly control surface. Various embodiments contemplate a ball-and-socket joint (optionally additively manufactured) for a sUAS tail that is capable of twist and pitch motion by way of a five-bar linkage. The five-bar linkage is configured to operate an end effector in cartesian coordinates which, when joined to the ball-and-socket, allows for coupled rotation of the SUAS tail in twist and pitch.

18 Claims, 4 Drawing Sheets

(56) References Cited

OTHER PUBLICATIONS

Ajanic E, Ferokshan M, Mintchev S, Noca F, and Floreano D., "Bioinspired Wing and Tail Morphing Extends Drone Fight Capabilities," Science Robotics, 2020; 5: 1-12.
Eric Chang, Laura Y. Matloff, Amanda K. Stowers, and David Lentink, "Soft biohybrid morphing wings with feathers underactuated by wrist and finger motion," Science Robotics, 2020; 5.
Murayama Y, Nakata T, and Liu H., "Aerodynamic Performance of a Bird-Inspired Morphing Tail. Journal of Biomechanical Science and Engineering," 2023; 18(1): 1-11.
Dr. Todd C. Henry, presentation titled "Small Aerial Robotic Morphology and Control," given at a workshop jointly hosted by Army Research Office and University of Maryland Baltimore County (UMBC) at the UMBC campus on Aug. 20, 2024.
Todd C Henry , Kevin PT Haughn , Madeline Morales and John T Hrynuk, "Ball-and-Socket joint produces longitudinal and lateral control with a horizontal feathered tail for small uncrewed aerial systems," International Journal of Micro Air Vehicles 17: 1-14 (2025).

* cited by examiner effector
$-\theta_1$
$-\theta_2$ effector
$-\theta_1$
$+\theta_2$ effector
$+\theta_1$
$-\theta_2$ effector
$+\theta_1$
$+\theta_2$ 120
101
$+\theta_2$ effector
Servo 1
Servo 2
$\theta_1$
$\theta_2$
102A
102B
105A
106A
105B
106B
110
501
502
500

TWIST-PITCH COUPLED BALL-AND-SOCKET JOINT FOR AN AIRCRAFT HORIZONTAL TAIL

GOVERNMENT INTEREST

The invention described herein may be manufactured and used by or for the Government of the United States for all governmental purposes without the payment of any royalty.

FIELD OF THE DISCLOSURE

The present disclosure relates generally to aircraft pitch and yaw control and, more particularly, to a control mechanism for an aircraft tail assembly for use in aircraft such as small Unmanned Aerial Systems (SUAS).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Traditional aircraft control yaw and pitch via uncoupled control surfaces on a tail assembly; namely, via a rudder (vertical tail) and elevator (horizontal tail). While this system has worked well for many years, improvements are desired, especially improvements resulting in improved maneuverability and agility in spaces where adverse aerodynamics and obstacles exist such as at very low altitudes.

SUMMARY OF THE INVENTION

Various deficiencies in the prior art are addressed below by a control assembly configured to control presentation of an aircraft tail assembly control surface. Various embodiments contemplate a ball-and-socket joint (optionally additively manufactured) for an aircraft such as a small Unmanned Aerial System (SUAS) that is capable of twist and pitch motion by way of a five-bar linkage. The five-bar linkage is configured to operate an end effector in cartesian coordinates which, when joined to the ball-and-socket, allows for coupled rotation of the SUAS tail in twist and pitch.

A control assembly configured to control presentation of an aircraft tail assembly control surface according to an embodiment comprises: an elongated spine having a proximal end and a distal end, the proximal end of the spine having mounted thereon first and second motors, the distal end defining a first socket operably coupled to a first ball to form a first ball and socket joint, the first ball configured to be connected to the aircraft tail assembly such that motion of the first ball causes a change in presentation of the aircraft tail assembly control surface; each of the first and second motors operably coupled to proximate ends of respective first and second elongated tail links via respective first and second elongated motor links, distal ends of the first and second elongated tail links being coupled to an end effector assembly, the end effector assembly being coupled to the first ball such that motion of the end effector assembly causes motion of the first ball; wherein each of the first and second motors are configured to rotatably adapt respective first θ1 and second θ2 angles of respective first and second elongated motor links with respect to a neutral position to thereby operate the end effector assembly in cartesian coordinates and impart thereby at least one of pitch and twist motion to a control surface of a connected aircraft tail assembly.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 2:
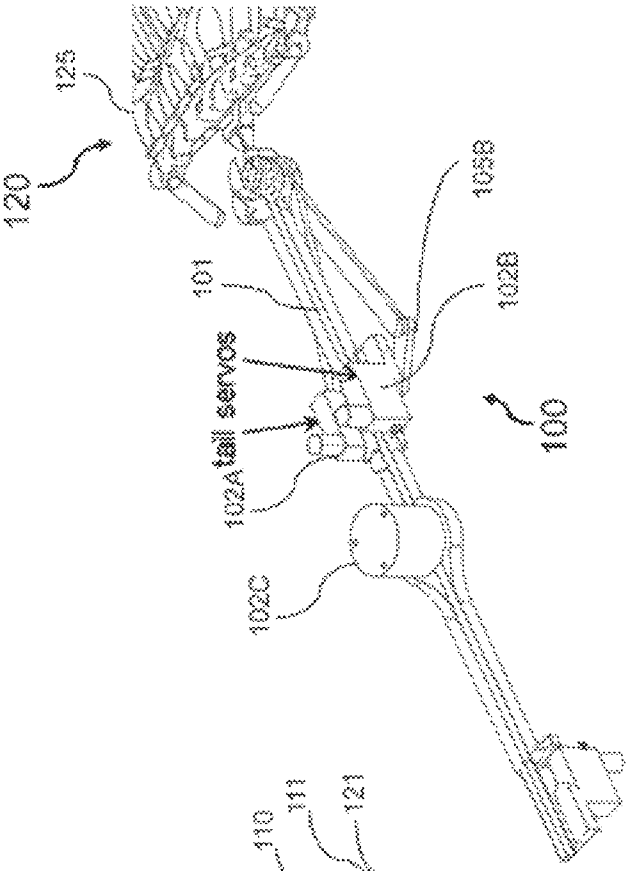
FIGS. 1-2 illustrate a control assembly according to various embodiments and configured to control presentation of an aircraft tail assembly control surface.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Part of the invention lies in the observation by the inventors that, for at least small aircraft such as small Unmanned Aerial Systems (SUAS), only a horizontal tail is necessary if it can be twisted, thereby removing the need for the vertical tail and thus reducing the number of control surfaces and thereby reducing aircraft drag and weight. Removing the vertical tail in favor of twisting and pitching only a horizontal tail induces coupled-roll, pitch, and yaw control albeit with an increase in controller demand.

Generally speaking, the various embodiments provide a control assembly configured to control presentation of an aircraft tail assembly control surface, such as depicted in the various figures. That is, various embodiments include a control assembly configured to control presentation of control surfaces of an aircraft tail assembly, an aircraft tail assembly including such a control assembly, and the like. The control assembly may be a separate assembly from the aircraft tail assembly and configured to be operably coupled/connected to the aircraft tail assembly. The control assembly may be integrated within an Unmanned Aerial System (UAS) and configured to be operably coupled/connected to a separate aircraft tail assembly. The control assembly and aircraft tail assembly may both be integrated within an Unmanned Aerial System (UAS).

The various embodiments are primarily directed to a control assembly configured to control presentation of an aircraft tail assembly control surface. Various embodiments comprise an elongated member or spine configured to provide a socket structure at a distal end supporting a ball and socket connection to a tail assembly. Motion of the ball, and thereby the tail assembly, is imparted by an end effector coupled to the ball and mechanically urged by a five-bar linkage connected between the end effector and a pair of motors or actuators (e.g., servo motors or actuators), each motor configured to rotatably adapt an angle θ of a respective motor link of the five-bar linkage with respect to a neutral position. In this manner, the two motors operate the end effector assembly in cartesian coordinates and controllably impart thereby pitch and twist motion to a tail assembly (to a control surface of a connected aircraft tail assembly).

Various embodiments contemplate a ball-and-socket joint (optionally additively manufactured) for an aircraft tail that is capable of twist and pitch motion by way of a five-bar linkage. The five-bar linkage is configured to operate an end effector in cartesian coordinates which, when joined to the ball-and-socket, allows for coupled rotation of the sUAS tail in twist and pitch.

Figure 1:
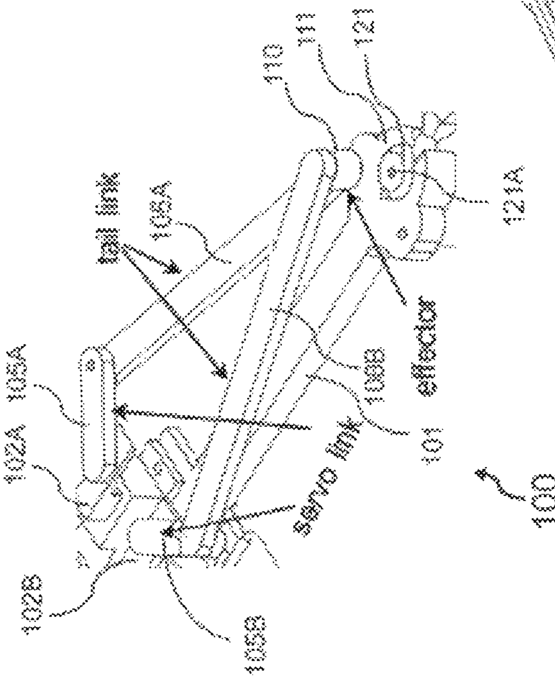
Figure 3:
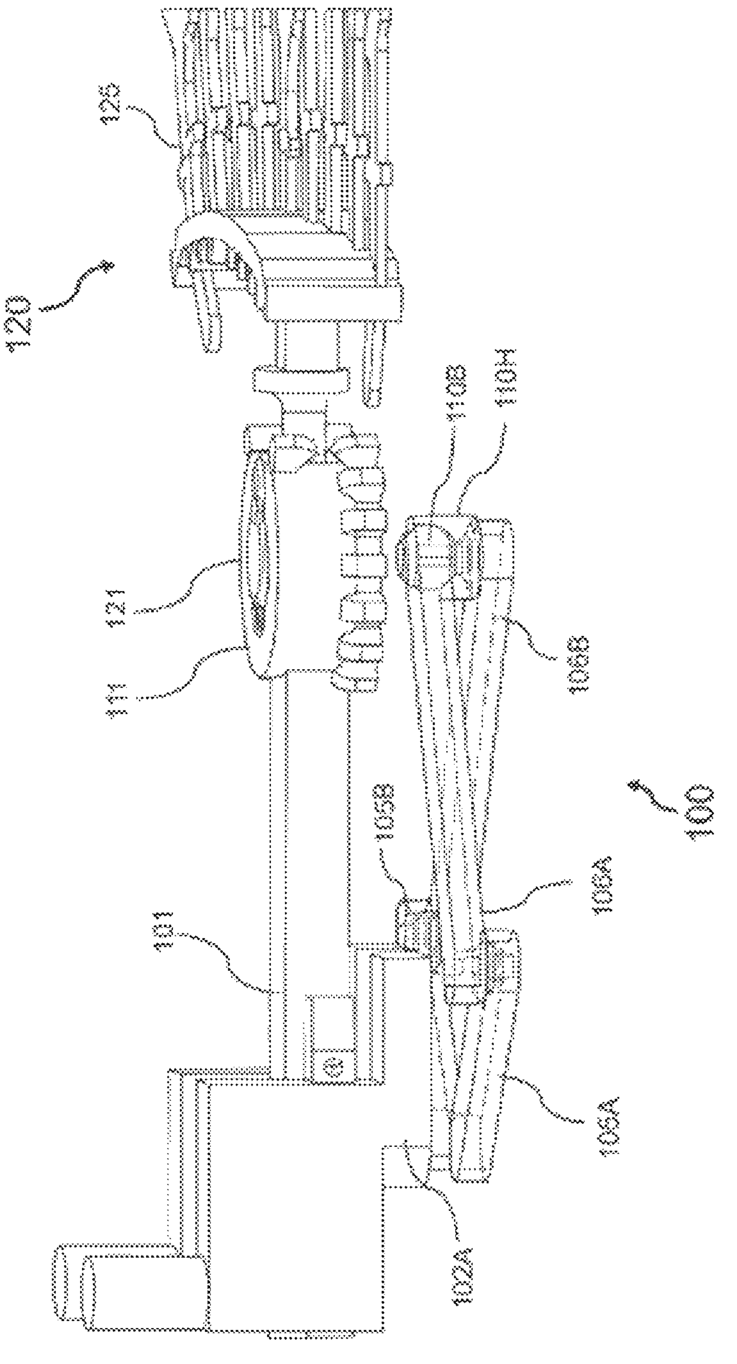
FIG. 3 illustrates a side view of a portion of the control assembly of FIGS. 1-2.
Figure 4:
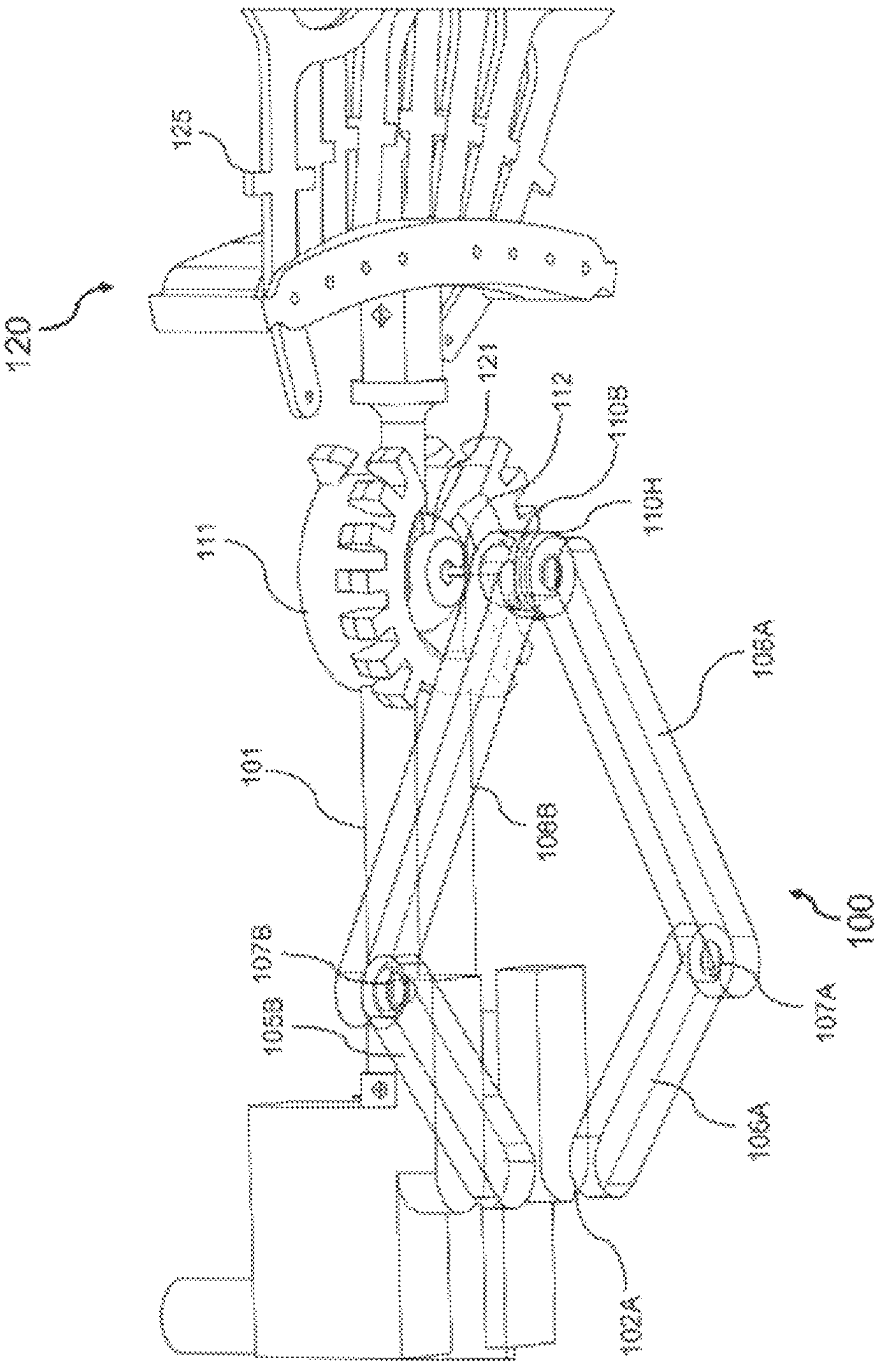
FIG. 4 illustrates a bottom perspective view of a portion of the control assembly of FIGS. 1-2.

FIGS. 1-2 illustrate a control assembly according to various embodiments and configured to control presentation of an aircraft tail assembly control surface. FIG. 3 illustrates a side view of a portion of the control assembly of FIGS. 1-2. FIG. 4 illustrates a bottom perspective view of a portion of the control assembly of FIGS. 1-2. The embodiments of FIGS. 1-4 will be discussed together.

Specifically, a control assembly 100 comprises an elongated spine 101 having a proximal end and a distal end, the proximal end of the spine having mounted thereon first 102A and second 102B motors, the distal end defining a first socket 111 operably coupled to a first ball 121 to form a first ball and socket joint, the first ball configured to be connected to the aircraft tail assembly 120 such that motion of the first ball 111 causes a change in presentation of a control surface 125 of the aircraft tail assembly 120.

Each of the first 102A and second 102B motors is operably coupled to proximate ends of respective first 105A and second 105B elongated motor links; the distal ends of first 105A and second 105B elongated motor links being rotatably coupled to proximate ends of respective first 106A and second 106B elongated tail links via respective first 107A and second 107B rotatable joints; the distal ends of the first 106A and second 106B elongated tail links being coupled to an end effector assembly 110. The end effector assembly 110 comprising a housing 110H coupled to a second ball 110B contained therein, the second ball 110B being coupled to the first ball 121 by a rigid coupling member 112 (shown in FIG. 4) protruding from the second ball 110B so as to extend into and mechanically couple with an aperture 121A of the first ball 121, such that motion of the end effector assembly 110 causing motion of the second ball 110B in turn causes motion of the first ball 121.

The five-bar linkage coupled to the end effector assembly comprises a portion of the non-moving spine 101, the elongated tail links 106, and the elongated motor links 105. Motion of the ball first ball 121, and thereby the tail assembly, is imparted by the end effector assembly 110 coupled to this first ball and mechanically urged by the five-bar linkage connected between the end effector and the pair of motors 102. In particular, each motor configured to rotatably adapt an angle θ of a respective motor link of the five-bar linkage with respect to a neutral position. In this manner, the two motors operate the end effector assembly in cartesian coordinates and controllably impart thereby pitch and twist motion to a tail assembly (to a control surface of a connected aircraft tail assembly).

Thus, various embodiments contemplate the use of a ball-and-socket in the articulated tail for simultaneous twist-pitch motion. A five-bar linkage controls the cartesian position of an end effector which is rigidly connected to the ball of the ball-and-socket. This two degree of freedom system is manipulated with two motors which define the angles $\theta_1$ and $\theta_2$ with every joint constrained by pinned boundary conditions. $\theta_1$ and $\theta_2$ start at an angular position that places the end effector directly under the ball-and-socket such that the tail is in-plane with the ground. If $\theta_1$ and $\theta_2$ move symmetrically the tail will pitch up and down, if they move asymmetrically the tail twists left and right. Combinations of symmetric/asymmetric motion results in mixtures of pitching and twisting, as shown below with respect to FIGS. 5A-5F.

Various embodiments contemplate a tail structure comprising synthetic feathers connected to each other with an elastic ligament-like material to provide a uniform splay of the tail. In some embodiments, the amount of splay and therefore the effective surface area of the control surface represented by the tail structure, is controlled by a third motor 102C (e.g., a third servo motor) coupled to the ligament-like material and operative to pull the material by an amount associated with a desired level of tail splay (e.g., from 50% splay wherein 50% of available surface is the effective surface area up to 100% splay wherein 100% of available surface is the effective surface area).

FIGS. 5A-5F illustrate a translation of cartesian motion of the control assembly of FIGS. 1-4 into pitch/twist motion of an aircraft tail assembly. Specifically, FIGS. 5A-5F illustrate a motion of the effector assembly 110 in response to the operation of the first 106A and second 106B motors upon the five bar linkage of the control assembly 100 of FIGS. 1-4.

Figures 5A, 5B, 5C, 5D, 5E, 5F:
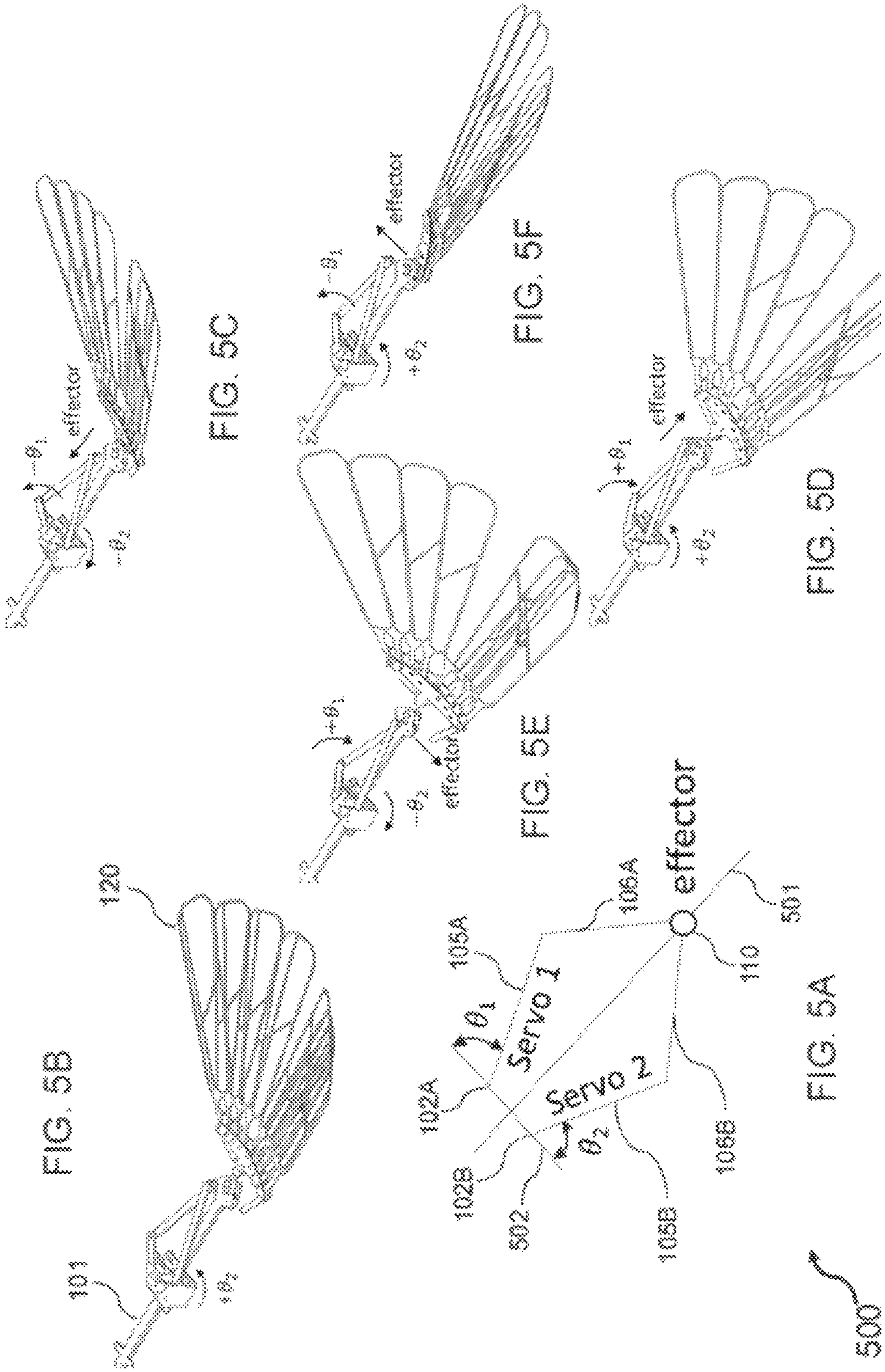
FIGS. 5A-5F illustrate a translation of cartesian motion of the control assembly of FIGS. 1-4 into pitch/twist motion of an aircraft tail assembly.

FIG. 5A depicts a schematic representation of the control assembly 100 of FIGS. 1-4. In particular, a first dashed line 501 represents an axial projection of the spine 101 from a point between the two motors 102A/102B through the effector assembly 110. The two motors are depicted at respective points upon a second dashed line 502 representing a lateral or normal projection with respect to the axial projection line 501.

First motor 102A rotatably operates first motor link 105A in a manner that increases or decreases a first angle θ1 of the first motor link 105A with respect to the normal projection 502. Second motor 102B rotatably operates second motor link 105B in a manner that increases or decreases a second $\theta_2$ of the second motor link 105B with respect to the normal projection 502.

The five bar linkage is controlled by the two motors which define $\theta_1$ and $\theta_2$ with all linkages pinned. Changes to $\theta_1$ and $\theta_2$ result in cartesian movement of the effector assembly which via the ball-and-socket joint with the tail assembly results in rotational changes in twist and pitch of the tail assembly.

FIG. 5B depicts the two motors 102 controllably placing the tail assembly 120 in a neutral yaw (no twist), neutral pitch (no pitch) position by causing the first motor link angle $\theta_1$ and second motor link angle $\theta_2$ to assume respective angles associated with the neutral position.

FIG. 5C depicts the two motors 102 controllably placing the tail assembly 120 in a neutral yaw (no twist), positive pitch (pitch up) position by causing the first motor link angle $\theta_1$ and second motor link angle $\theta_2$ to decrease by the same amount with respect to the neutral position, thereby pulling the effector assembly 110 forward without inducing a lateral motion thereof.

FIG. 5D depicts the two motors 102 controllably placing the tail assembly 120 in a neutral yaw (no twist), negative pitch (pitch down) position by causing the first motor link angle $\theta_1$ and second motor link angle $\theta_2$ to increase by the same amount with respect to the neutral position, thereby pushing the effector assembly 110 backward without inducing a lateral motion thereof.

FIG. 5E depicts the two motors 102 controllably placing the tail assembly 120 in a left yaw (twist left), neutral pitch (no pitch) position by causing the first motor link angle $\theta_1$ to increase by predetermined amount with respect to the neutral position and the second motor link angle $\theta_2$ to decrease by the same predetermined amount with respect to the neutral position, thereby moving the effector assembly 110 laterally toward the left without inducing an axial motion thereof (i.e., forward or backward).

FIG. 5F depicts the two motors 102 controllably placing the tail assembly 120 in a right yaw (twist right), neutral pitch (no pitch) position by causing the first motor link angle $\theta_1$ to decrease by predetermined amount with respect to the neutral position and the second motor link angle $\theta_2$ to increase by the same predetermined amount with respect to the neutral position, thereby moving the effector assembly 110 laterally toward the right without inducing an axial motion thereof (i.e., forward or backward).

Thus, it can be seen in FIGS. 5C-5F that changes to $\theta_1$ and $\theta_2$ result in cartesian movement of the effector assembly 110 which, via the ball-and-socket joint of the tail assembly connection, results in rotational changes in twist and pitch of the tail assembly 120.

Equal magnitude and direction servo motion creates pitching while equal magnitude and opposite direction motion creates twist. Other combinations of servo motion create combined pitch and twist. Specifically, changes of substantially the same magnitude of the first motor link angle $\theta_1$ and second motor link angle θ2 will result in changes of only one of the pitch and yaw of the tail assembly 120.

Changes of different magnitudes in the first motor link angle $\theta_1$ and second motor link angle $\theta_2$ will result in changes of both of the pitch and yaw of the tail assembly 120.

Adding left twist to positive pitch. Adding left twist to the positive pitch of FIG. 2C comprises causing the first motor link angle $\theta_1$ to decrease by a greater amount than the second motor link angle $\theta_2$, where increasing the difference between angles $\theta_1$ and $\theta_2$ will result in increasing the amount of left twist.

Adding right twist to positive pitch. Adding right twist to the positive pitch of FIG. 2C comprises causing the first motor link angle $\theta_1$ to decrease by a lesser amount than the second motor link angle $\theta_2$, where increasing the difference between angles $\theta_1$ and $\theta_2$ will result in increasing the amount of right twist.

Adding positive pitch to left twist. Adding positive pitch to the left twist of FIG. 2E comprises causing the first motor link angle $\theta_1$ to increase by a greater amount than the decrease of the second motor link angle $\theta_2$, where decreasing the magnitude of change of angles $\theta_1$ and $\theta_2$ will result in increasing the amount of pitch.

Adding negative pitch to left twist. Adding negative pitch to the left twist of FIG. 2E comprises causing the first motor link angle $\theta_1$ to increase by a smaller amount than the decrease of the second motor link angle $\theta_2$, where decreasing the magnitude of change of angles $\theta_1$ and $\theta_2$ will result in increasing the amount of pitch.

Advantageously, the disclosed five-bar linkage socket joint allows motor actuators to remain fixed in the UAS's body axis and reduces all internal actuation to a single plane of motion, decreasing mechanical complexity and volumetric requirements for implementation.

Various embodiments use an additively manufactured ball and socket joint for a SUAS tail that is capable of twist and pitch motion by way of a five-bar linkage. The five-bar linkage creates a planar cartesian motion of an end effector from two angular inputs. When the end effector is connected by a ball and socket joint via a rigid connector to another ball and socket joint in the tail this cartesian movement is converted back into two rotations pitch and twist. This allows for the use of only a horizontal tail for coupled stability and control reducing the total tail area and thus reducing drag. Typical fixed wing aircraft design sizes a fixed horizontal and vertical tail in area with an elevator (horizontal-pitch) and rudder (vertical-yaw) for control.

Various embodiments may be used to increase the dynamic maneuver capabilities of small unmanned aerial systems in and around the ground for behaviors such as perching, pursuit, and/or rejections of longitudinal or lateral disturbances. Military operations may want to operate though congested environments like penetration though a forest, perching and waiting, landing on a moving ground vehicle, etc. for which this technology may accommodate.

Various embodiments may be used to increase commercial vehicle/system maneuverability and agility near the ground for package delivery in cities or in congested airspaces where higher altitude flight is prohibited.

Thus, various embodiments provide a novel, articulated aircraft tail (e.g., SUAS tail) with coupled twist-pitch motion via a ball-and-socket joint. The ball-and-socket joint is controlled by a five-bar linkage which allows two servos to work together in twist-pitch motion, as opposed to dedicated traditional elevator and rudder servo control, removing the need for any vertical tail structure. The articulated tail may be constructed of synthetic feathers which slide over one another via a splay degree of freedom controlled by a third servo.

Additive manufacturing (e.g., 3D printing and the like) may be used in the construction of all parts, such as one or both of the first and second ball and socket joints, the various motor links, effector, tail assembly and/or portions thereof (e.g., control surfaces and structural support thereof), and so on.

Further, the addition of continuous carbon fiber (CCF) reinforcement in some embodiments provides an increase in structural stiffness from 1-2 GPa for plastic to 15-20 GPa for CCF reinforcement. Such CCF reinforcement may be used within the context of standard manufacturing and/or additive manufacturing of any of the various parts discussed herein.

The articulated tail design is capable of enabling fine five axis control (e.g. no roll moment control) via pitch and twist morphing across a broad range of angles of attack and airspeeds. The articulated tail pitched to generate large drag and pitching moments at very high angles of attack and twisted to generate side force and yaw moment without changing the longitudinal characteristics.

An articulated tail construction like the one presented in this manuscript can produce considerable changes in tail area to generate large drag forces and control moments at high angles of attack. Lift was found to decrease post-stall as angle of attack increased past around 40° with increased drag suggesting a level and slowing trajectory may be possible with this design while additional control via changing the tail area could make a vehicle/system more tolerant to both longitudinal and lateral disturbances. The ball-and-socket joint presented in this work allowed for unique twist-pitch control at the same axis of rotation, with both actuators acting to position the tail at high angles against drag and pitch. Compliance in the joint and synthetic feathers was observed to not have a significant adverse effect on the aerodynamic performance for the ligament and feather stiffness addressed in this manuscript.

The ball-and-socket design removes the need for any vertical elements to the tail to control side force and yaw. Additionally, any adverse lateral forces or moments such as those from gusts while at high angle of attack would be of lesser magnitude from the lower vehicle/system cross-sectional area and could be addressed by this design via twist without changing longitudinal performance. The aerodynamic performance was similar to a flat plate which significantly underperforms engineered airfoils. However, an articulated tail can greatly change tail area and compact tightly for stowing or launching. Future work could consider perception of current tail pose to account for compliance with additional servo command to reach target tail displacements.

Aspects of this invention have been previously disclosed by the inventors in a presentation titled "Small Aerial Robotic Morphology and Control," given at a workshop jointly hosted by Army Research Office and University of Maryland Baltimore County (UMBC) at the UMBC campus on 20 Aug. 2024; a copy of that presentation is herein incorporated by reference in its entirety for all purposes.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A control assembly configured to control presentation of an aircraft tail assembly control surface, the control assembly comprising:

an elongated spine having a proximal end and a distal end, the proximal end of the spine having mounted thereon first and second motors, the distal end defining a first socket operably coupled to a first ball to form a first ball and socket joint, the first ball configured to be connected to the aircraft tail assembly such that motion of the first ball causes a change in presentation of the aircraft tail assembly control surface;

each of the first and second motors operably coupled to proximate ends of respective first and second elongated tail links via respective first and second elongated motor links, distal ends of the first and second elongated tail links being coupled to an end effector assembly, the end effector assembly being coupled to the first ball such that motion of the end effector assembly causes motion of the first ball;

wherein each of the first and second motors are configured to rotatably adapt respective first $\theta_1$ and second $\theta_2$ angles of respective first and second elongated motor links with respect to a neutral position to thereby operate the end effector assembly in cartesian coordinates and impart thereby at least one of pitch and twist motion to a control surface of a connected aircraft tail assembly.

2. The control assembly of claim 1, wherein the end effector assembly is coupled to a second ball and socket joint, and a rigid connector connects the second ball to the first ball such that cartesian movement of the end effector assembly is converted into two rotations pitch and twist of the aircraft tail assembly control surface.

3. The control assembly of claim 1, wherein increases to first angle $\theta_1$ and second angle $\theta_2$ of the same magnitude and a first direction cause cartesian space motion of the effector assembly away from the first and second motors.

4. The control assembly of claim 1, wherein decreases to first angle $\theta_1$ and second angle $\theta_2$ of the same magnitude and a second direction cause cartesian space motion of the effector assembly toward the first and second motors.

5. The control assembly of claim 1, wherein changes to first angle $\theta_1$ and second angle $\theta_2$ angle of different magnitudes or different directions cause combined cartesian space motion of the effector assembly such that at least one of a twist motion and a pitch motion is imparted to a connected aircraft tail assembly.

6. The control assembly of claim 1, further comprising a third motor operably coupled to an adjustable tail splay mechanism and configured to controllably adjust an effective surface area of a tail assembly control surface.

7. The control assembly of claim 1, wherein at least one of the first and second ball and socket joints comprise additively manufactured ball and socket joints.

8. The control assembly of claim 1, wherein at least one of the ball and socket joints and the motor links comprise additively manufactured parts.

9. The control assembly of claim 1, wherein the additively manufactured parts further include continuous carbon fiber (CCF) reinforcement.

10. The control assembly of claim 1, wherein, the control assembly is integrated within an aircraft tail assembly.

11. The control assembly of claim 1, wherein the control assembly is integrated within an aircraft and configured to be coupled thereby to an aircraft tail assembly.

12. The control assembly of claim 11, wherein the aircraft comprises an Unmanned Aerial System (UAS).

13. The control assembly of claim 1, wherein the control assembly and aircraft tail assembly are integrated within an aircraft.

14. The control assembly of claim 1, wherein the motors comprise servo motors.

15. An aircraft tail assembly comprising the control assembly of claim 1.

16. The aircraft tail assembly of claim 15, wherein the aircraft tail assembly is integrated within an aircraft.

17. The aircraft tail assembly of claim 16, wherein the aircraft comprises an Unmanned Aerial System (UAS).

18. An aircraft having an aircraft tail assembly comprising the control assembly of claim 1.

* * * * *